United States Patent [19]

Marshall

[11] Patent Number: 4,977,680
[45] Date of Patent: Dec. 18, 1990

[54] LOFT INDICATOR AND LIE DETECTOR FOR GOLF CLUB HEADS

[76] Inventor: Perry C. Marshall, 103 Granda Ct. North, Plant City, Fla. 33566

[21] Appl. No.: 349,747

[22] Filed: May 10, 1989

[51] Int. Cl.⁵ .............................................. G01C 9/28
[52] U.S. Cl. ....................................... 33/508; 33/367; 33/371; 33/382; 33/347
[58] Field of Search ................. 33/508, 333, 334, 340, 33/341, 347, 367, 370, 371, 376, DIG. 1, 534, 1 N, 381, 382; 273/32 R, 32 B, 32 H, 183 D, 183 R, 194 R, 194 A, 162 B, 162 R, 163 R, 164, 167 G

[56] References Cited

U.S. PATENT DOCUMENTS

| | | | |
|---|---|---|---|
| 1,483,242 | 2/1924 | Pearce | 33/382 |
| 2,501,745 | 3/1950 | Sherman | 33/341 |
| 2,877,561 | 3/1959 | Morse | 33/370 |
| 2,923,552 | 2/1960 | Sunberg | 273/162 B |
| 2,948,067 | 8/1960 | Mistretta | 33/381 |
| 3,213,545 | 10/1965 | Wright | 33/347 |
| 4,425,784 | 1/1984 | D'Gerolamo | 33/334 |
| 4,468,034 | 8/1984 | Duclos | 33/508 |
| 4,580,350 | 4/1986 | Fincher | 33/334 |
| 4,817,294 | 4/1989 | Lai | 33/508 |
| 4,858,332 | 8/1989 | Thomas | 33/508 |

FOREIGN PATENT DOCUMENTS

| | | | |
|---|---|---|---|
| 0171618 | 10/1983 | Japan | 33/367 |
| 2163658 | 3/1986 | United Kingdom | 273/183 D |
| 2197493 | 5/1988 | United Kingdom | 33/508 |

Primary Examiner—William A. Cuchlinski, Jr.
Assistant Examiner—Christopher W. Fulton
Attorney, Agent, or Firm—Joseph C. Mason, Jr.; Ronald E. Smith

[57] ABSTRACT

A clinometer releasably securable to a golf club head to indicate its loft and to detect its lie. The clinometer has a sector shape and its circumferential extent is sixty degrees of arc. An arcuate bubble tube having accompanying indicia to indicate differing angular orientations of a club head face is secured to the arcuate top wall of the device and a straight bubble tube extends horizontally from a flat sector shaped wall to show the lie of the club head.

5 Claims, 2 Drawing Sheets

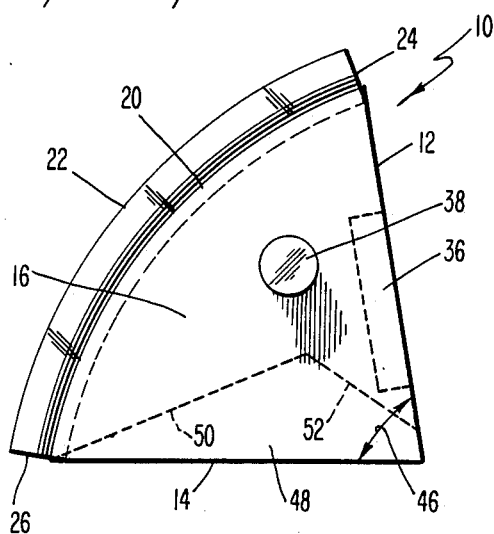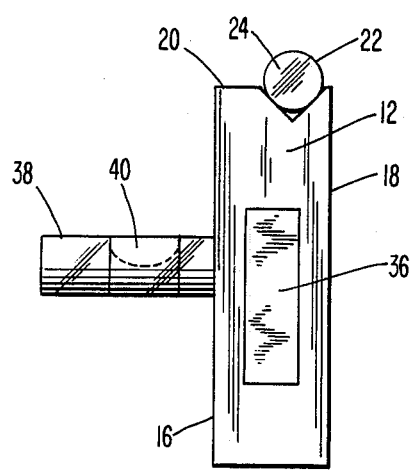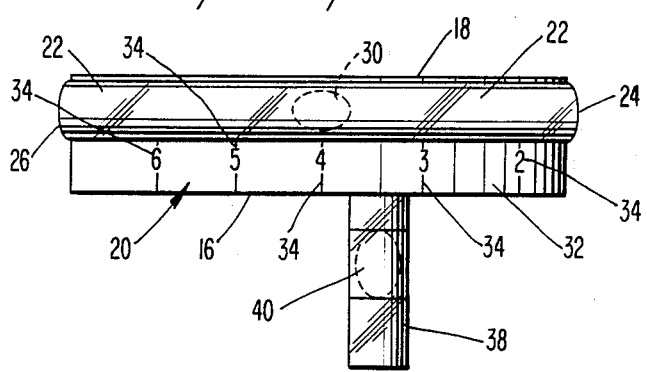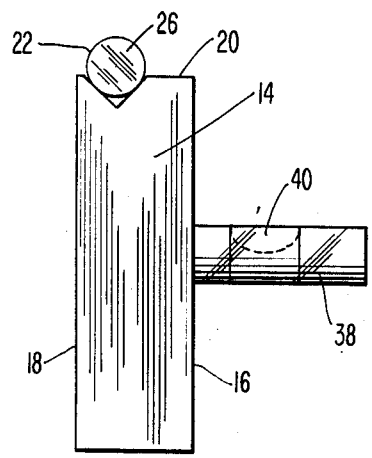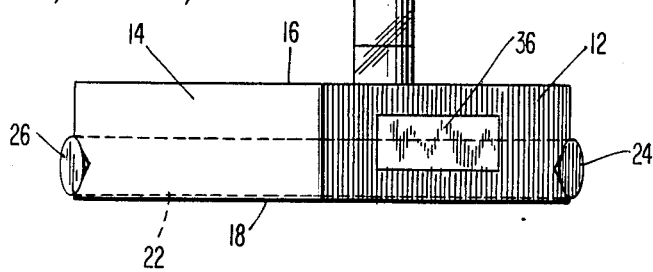

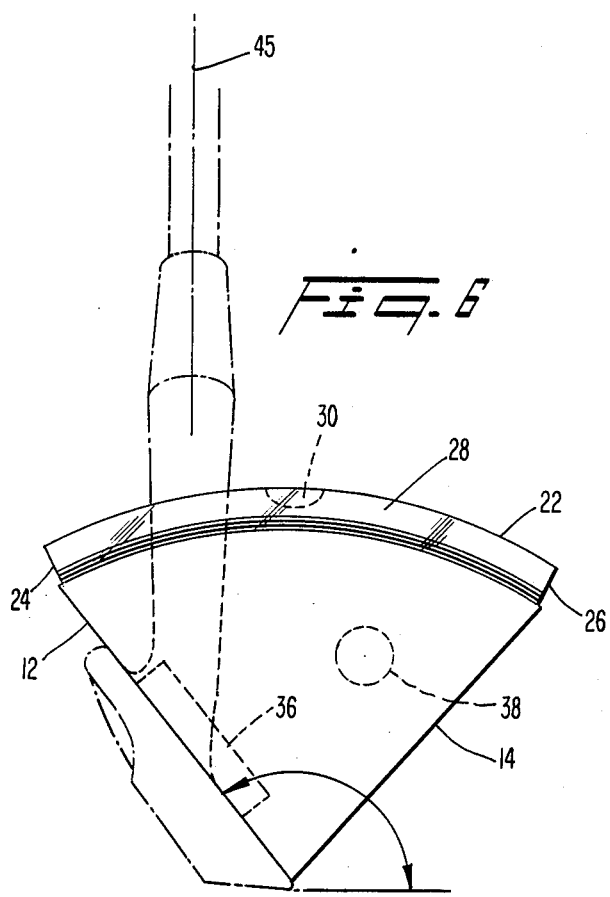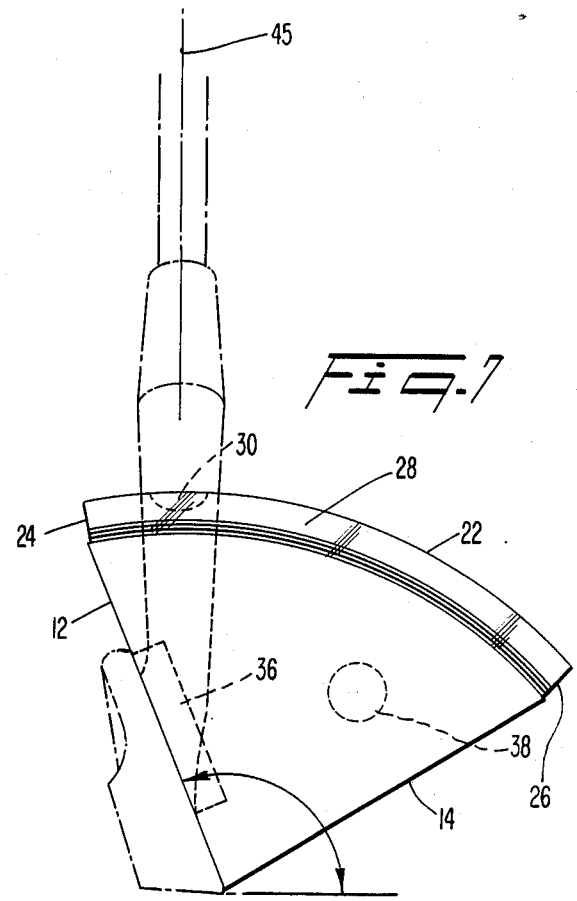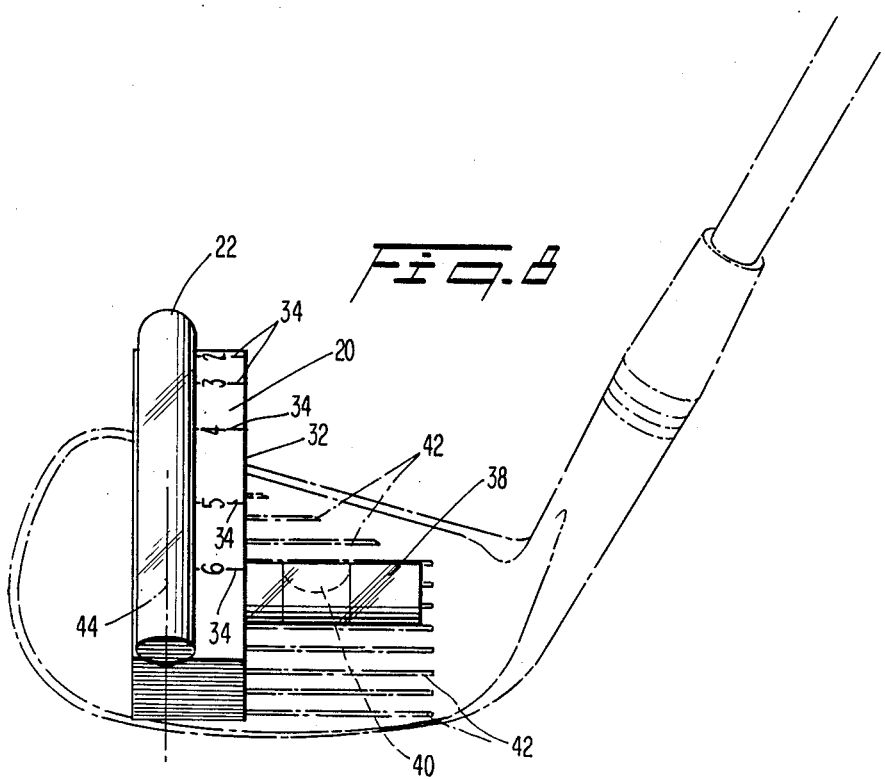

LOFT INDICATOR AND LIE DETECTOR FOR GOLF CLUB HEADS

TECHNICAL FIELD

This invention relates, generally, to devices attachable to golf club heads as training aids or for other reasons. More particularly, this invention relates to a device that measures the loft of a club head and indicates its lie.

BACKGROUND ART

The loft of a golf club head determines the launching angle of the ball; accordingly, a golfer should know the loft angle of the club about to be used. Club manufacturers, however, do not identify the degrees of loft of any club, relying upon the golfer to know that a 7 iron has 40% of loft, for example.

Some manufacturers even produce clubs that do not have standard loft angles. For example, a manufacturer may introduce to the market a "new, improved" 7 iron that purportedly produces longer shots, when in fact the manufacturer has merely decreased the standard 7 iron loft angle from 40 degrees to 35 degrees.

Accordingly, there is a need for a device that measures the actual loft of a club head in degrees. The loft of unknown clubs could be determined if such a device were known, and the loft angle of "known" clubs could be verified.

When a golf ball is to be addressed, the golfer imagines a vertical plane passing through the center of the ball and through his or her body. The club is then held in that vertical plane. If the sole of the club is not held in a horizontal plane, the lie of the club is incorrect and a poor shot will result. Golf club manufacturers provide no means for a golfer to check the lie produced by his or her grip. If a lie detector were known, it would have great utility as a training aid.

If a loft indicator and lie detector could be provided in a single unit, then the advantages of each could be simultaneously enjoyed.

The prior art contains no teachings that disclose a combination loft indicator and lie detector. Nor does the prior art contain suggestions that would impel one of ordinary skill in the pertinent art to combine the disclosures of the prior art in such a way to produce a combination golf loft and lie detector.

There are a number of U.S. patents that show devices attachable to golf club heads or to other parts of the golf club. For example, Sundberg U.S. Pat. No. 2,923,552 shows a magnetic mounter for a golf club of conventional design, such as a putter, for the purpose of permitting the achievement of coordination of body and arm movement in putting. An indicator tube containing an indicator ball and liquid is provided along a radius of curvature of about six inches.

Vella U.S. Pat No. 3,909,004 and Liljequist U.S. Pat. No. 3,306,618 both provide bubble level indicators for golf club heads, as do Skelley U.S. Pat. No. 2,919,922 and McCullough, Jr. U.S. Pat. No. 2,976,046. Fincher U.S. Pat. No. 4,580,350 discloses a magnetic bubble level indicator that may be added to any of a variety of conventional golf club heads. Olexson, et al., U.S. Pat. No. 3,225,451, Miley U.S. Pat. No. 2,789,363 and Mayes U.S. Pat. No. 4,593,475 show magnetic levels having two level indicators. Dixon U.S. Pat. No. 3,751,819, Fay U.S. Pat. No. 2,670,209, and Vogt U.S. Pat. No. 2,836,900 show a variety of indicia for levels and the like.

Clearly, there are many devices attachable to golf clubs and golf club heads, but there are no devices that combine a golf loft indicator and a lie detector in a single unit. More importantly, the prior art does not suggest how such a combination device could be provided.

DISCLOSURE OF INVENTION

The present invention is a clinometer having the shape of a sector when seen in side elevation. A sector is a geometric figure bounded by two radii and the included arc of a circle.

A permanent magnet is embedded in a preselected radial wall so that it lies flush with the surface thereof; the magnet releasably secures the clinometer to the club head.

An arcuate closed end tube substantially filled with a colored liquid fluid is fixedly secured to the arcuate top wall of the sector-shaped device. A bubble of air is trapped therein and serves as a loft indicator means when the invention is used in the manner indicated hereinafter. An indicia means having graduation marks thereon that correspond to differing loft angles is also secured to the arcuate top wall of the device adjacent the bubble tube. The loft of a club head is indicated by the alignment of the bubble with an indicia means when the club is properly held.

A second air bubble-containing closed end tube is fixedly secured to a vertical flat wall of the device and projects normally therefrom in a horizontal plane, when the club is properly held, toward the golfer. The golfer holds the club shaft in a vertical plane and adjusts its angle until the bubble is centered within the second bubble tube to indicate that the club head is level. When the club head is level, its "lie" is correct.

In this manner, a loft indicator and a lie detector are provided in a single device.

It is therefore understood that a primary object of this invention is to provide a combination loft and lie indicator.

The invention accordingly comprises the features of construction, combination of elements and arrangement of parts that will be exemplified in the construction set forth hereinafter and the scope of the invention will be set forth in the claims.

BRIEF DESCRIPTION OF DRAWINGS

For a fuller understanding of the nature and objects of the invention, reference should be made to the following detailed description, taken in connection with the accompanying drawings, in which:

FIG. 1 is a side elevational view of the preferred embodiment of this invention;

FIG. 2 is a front elevational view thereof;

FIG. 3 is a top plan view thereof;

FIG. 4 is a rear elevational view thereof;

FIG. 5 is a bottom plan view thereof;

FIG. 6 is a side elevational view of the novel device releasably secured to a face of a golf club head of a certain loft and goal;

FIG. 7 is a front elevational view of the novel device releasably secured to the face of the golf club head of a second predetermined angle; and FIG. 8 is a front elevational view of the device releasably secured to the face of a golf club head.

Similar reference numerals refer to similar parts throughout the several views of the drawings.

BEST MODES FOR CARRYING OUT THE INVENTION

Referring now to the Figures, it will there be seen that an illustrative embodiment of the invention is denoted by the reference numeral 10 as a whole.

Device or clinometer 10 has a sector shape; it includes first radial wall 12, second radial wall 14, flat forward wall 16, flat rearward wall 18, and arcuate top wall 20. An arcuate bubble tube 22 overlies and is secured to top wall 20 and is contoured to conform to the curvature thereof. Tube 22 has closed ends 24, 26 and is substantially filled with a pigmented liquid fluid 28, there being an air bubble 30 (See FIGS. 6 and 7) trapped therewithin.

An elongate label 32 (FIGS. 3 and 8) also overlies top wall 20 and indicia means, collectively denoted 34, are imprinted thereon.

Alternatively, the indicia means 34 could be imprinted directly on tube 22.

Each indicum indicates a loft angle; for example, the numeral "2" indicates a twenty degree loft angle when bubble 30 is aligned therewith, numeral "3" indicates a thirty degree loft angle, etc. When the golf club is held in a vertical plane that extends between the ball and the golfer, bubble 30, which will always be at the highest point of bubble tube 22, regardless of the loft of the club head to which device 10 is attached, will register with one of the indicia means (or interpolated intermediate indicia means) to indicate the loft angle of the club head.

A permanent magnet 36 is embedded in radial wall 12 so that its top surface lies flush with wall 12, i.e., a recess is formed in radial wall 12 to receive magnet 36 therein; the magnet is retained in the recess by a suitable adhesive.

A straight bubble tube 38 is fixedly secured to forward wall 16 and projects perpendicularly therefrom; it is also substantially filled with a pigmented liquid fluid so that an air bubble 40 is trapped therein.

Tube 38 may be positioned at any preselected position on forward wall 16. Although tube 38 would project away from a left-handed golfer, it would still be visible. However, a left handed version of the device 10 could be supplied with the straight tube 38 projecting from wall 18.

Every club head face has a plurality of parallel horizontal score lines 42 formed thereon as shown in FIG. 8, and a single vertical score line 44 normal thereto. To use device 10, magnet 36 is placed so that it is in parallel alignment with said vertical score line 44 as shown in FIG. 8.

The club is then held in the imaginary vertical plane 45 (FIGS. 6 and 7) that passes through the center of the ball, or a plane parallel thereto, and the golfer's body. The position of bubble 40 in straight tube 38 will indicate whether or not the lie of the club head is correct and the position of bubble 30 in arcuate tube 22 will indicate the loft of the club head. For example, a forty degree loft angle is indicated for the club head (not shown) in FIG. 3. Thus, if the loft is unknown, device 10 reveals the loft. Moreover, if the club head had been sold as having a certain degree of loft, device 10 will verify or disprove the manufacturer's claim.

Angle 46 (FIG. 1) is fifty to sixty degrees, although that angle is not critical. Nor must device 10 have a precise sector shape. To save material, for example, the region of device 10 indicated by the reference numeral 48 could be removed and lines 50, 52 would become the peripheral boundaries of the device. Material saving bores could also be formed in the device.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An apparatus that indicates the degrees of loft of golf club head, comprising:
   a base member having an arcuate top wall, a flat front wall, a flat backwall, a first radial wall and a second radial wall;
   a permanent magnet being embedded in a preselected radial wall so that a top surface of said magnet is flush with said preselected radial wall;
   an arcuate tube member fixedly secured in surmounting relation to said arcuate top wall;
   said arcuate tube member being substantially filled with a liquid fluid so that an air bubble is captured therewithin;
   a linear in configuration tube member rigidly secured to a preselected flat wall of said base member said linear in configuration tube member projecting perpendicularly from said base member;
   said linear in configuration tube member being substantially filled with a liquid fluid so that an air bubble is captured there within;
   said first and second radial walls being flat and orthogonally disposed with respect to said front wall and said back wall; and
   said front and back walls of said base member being disposed in parallelism with a vertical score line formed in a face of a golf club head when said magnet releasably secures said base member to said club head.

2. The apparatus of claim 1, wherein said arcuate top wall extends through fifty to sixty degrees of arc.

3. The apparatus of claim 1, wherein said arcuate tube extends through sixty degrees of arc.

4. The apparatus of claim 1, further comprising an indicia means fixedly secured to said arcuate top wall adjacent said arcuate tube member, said indicia means having graduation marks thereon indicating differing loft angles, said air bubble registering with an indicia means to indicate the loft angle of a club head.

5. The apparatus of claim 4, wherein said base member is sector-shaped.

* * * * *